June 14, 1927.

M. HEMLEB 1,631,962

SHAFT BEARING

Filed July 16, 1923

WITNESSES

INVENTOR
Martin Hemleb
BY
Henry Miller
ATTORNEY

Patented June 14, 1927.

1,631,962

UNITED STATES PATENT OFFICE.

MARTIN HEMLEB, OF ELIZABETH, NEW JERSEY, ASSIGNOR TO THE SINGER MANUFACTURING COMPANY, OF ELIZABETH, NEW JERSEY, A CORPORATION OF NEW JERSEY.

SHAFT BEARING.

Application filed July 16, 1923. Serial No. 651,802.

This invention relates to shaft bearings and has for an object to provide a self-lubricating bearing or bearing bushing particularly adapted for a high-speed shaft, such as the lower or hook shaft of a rotary-hook sewing machine. In sewing machines of the rotary-hook type, the hook-shaft commonly makes a plurality of revolutions for each complete reciprocation of the needle, which means that in a sewing machine making, say, 4000 stitches per minute, the hook shaft is making 8000 R. P. M. in a 2 to 1 machine or 12000 R. P. M. in a 3 to 1 machine. Thus the problem of bearing lubrication becomes important if quiet running and a satisfactory bearing life are to be attained.

To the accomplishment of the ends in view, the bearing is preferably made up in the form of a cylindrical bushing adapted to be inserted in a cylindrical bearing aperture in the machine frame. The bushing may comprise an outer or casing member and an inner or core member telescopically fitted to the outer member. The core member is preferably formed at the upper side of its outer surface with a longitudinally extending oil-receiving and distributing groove and at the lower side of its outer surface with a longitudinally extending groove constituting an oil-pocket; the two grooves being preferably connected by a plurality of circumferential grooves in the outer surface of the core member. The oil is preferably fed from the oil-pocket to the shaft through a capillary slot cut through the wall of the core member separating the oil-pocket from the inner or bearing surface of the bushing. The bushing is formed at its ends with internal circumferential grooves communicating with the oil-pocket groove and serving to catch any oil thrown from the shaft at the ends of the bearing and return it to the pocket.

Figure 1:
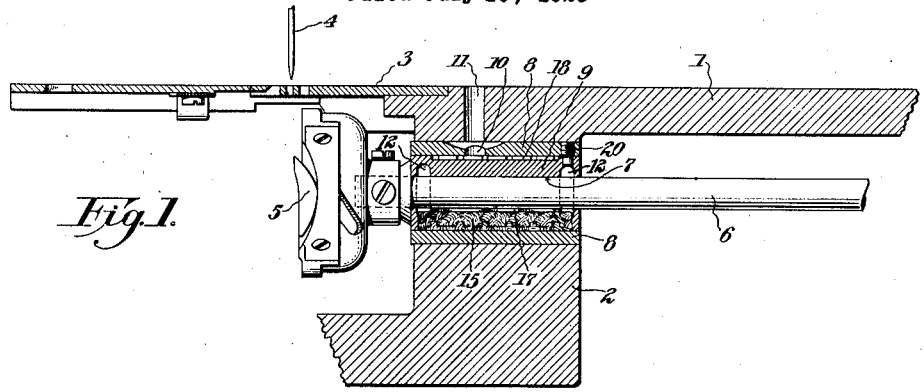
Figure 2:
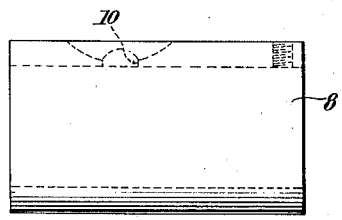
Figure 4:
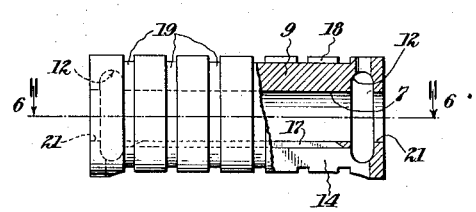
Figure 3:
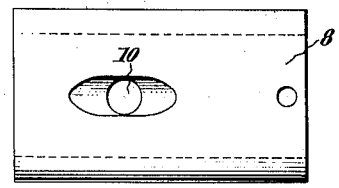
Figure 5:
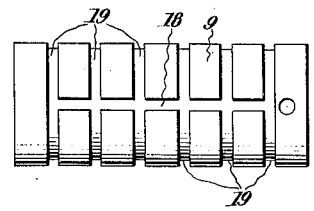
Figure 6:
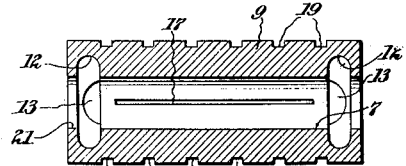
Figure 7:
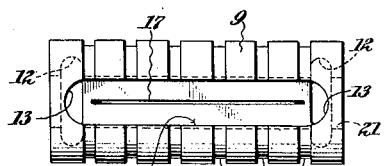
Figure 8:
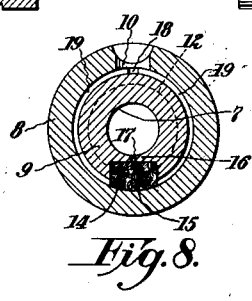

In the accompanying drawings, Fig. 1 is a longitudinal vertical section of the shaft bearing as applied to a rotary-hook sewing machine. Figs. 2 and 3 are, respectively, side elevation and top plan views of the casing member of the bearing. Figs. 4 and 5, are, respectively, side elevation (partly in section) and top plan views of the core member. Fig. 6 is a horizontal section through the core member on the line 6, 6, Fig. 4. Fig. 7 is a bottom plan view of the core member and Fig. 8 is a transverse section through the casing and core members.

In the preferred embodiment of the invention, as illustrated, 1 represents a sewing machine bed-casting having a bearing bracket 2 and fitted with a throat-plate 3 for the reciprocating needle 4 which cooperates with the rotary hook 5 to form stitches. The hook 5 is carried by a hook-shaft 6 which is journaled in the bearing aperture 7 of a special bearing bushing sustained by the frame lug 2.

The bearing bushing may comprise an outer or casing member 8 and an inner or core member 9 which, preferably, is snugly fitted telescopically to the casing member, as by a light driving fit. The casing member, when used, may have the form of a simple sleeve provided at its upper side with an oil-hole 10 adapted to register with an oil-supply duct 11 in the machine frame.

The core member 9 is preferably of hollow cylindrical form having the inner bearing surface 7 at the ends of which are formed the internal circumferential oil-catching grooves 12, 12 which communicate through the apertures 13, 13 with the oil-pocket groove 14 extending longitudinally of the core member 9. The oil-pocket groove is preferably filled with a strip of felt 15 or other oil-absorbent material and is separated from the bearing aperture 7 by a relatively thin wall 16, Fig. 8, through which is cut a fine capillary slot 17 extending longitudinally and centrally of the reservoir groove 14.

The core member 9 is formed opposite the oil-pocket groove 14 with a longitudinally extending oil-receiving and distributing groove 18 which is connected to the pocket groove 14 by means of the circumferential grooves 19. A screw 20, Fig. 1, may be employed to fix the core and casing members in assembled relation. The apertures 21 in the extreme ends of the bearing member 9 are shaft clearance apertures and are preferably made a little larger than the shaft so as not to touch the latter.

The lubricant is supplied to the bearing through the duct 11, whereupon it distributes itself along the upper longitudinal groove 18 and runs down the circumferential oil-feeding grooves 19, quickly and evenly saturating the absorbent strip 15 in the groove 14, which, when the bushing is in working position and suitably encased, constitutes an oil-reservoir. When the machine is in operation the lubricant is drawn upwardly from the reservoir through the capillary slot 17 and is evenly distributed as a thin film between the shaft and bearing walls. As the oil works out at the ends of the bearing it is thrown off by the shaft into the internal oil-receiving grooves 12 which return it to the reservoir 14 without permitting escape of oil through the shaft openings 21.

The present bearing will run for long periods without replenishment of the lubricant supply and is simple in construction and easy to assemble with the machine. It constitutes a unit which may be removed from and replaced in the machine in the same manner as an ordinary bearing bushing, yet it is self-lubricating; the oil repeatedly traversing a circuit from the supply reservoir to and between the bearing surfaces and back to the supply.

It will be apparent that the sleeve-element 8 may be omitted by fitting the core element directly to a bushing aperture in the machine frame.

Having thus set forth the nature of the invention, what I claim herein is:—

1. A bearing bushing comprising a sleeve formed in its outer surface with a depression constituting an oil-pocket, and separate capillary oil-supply and gravity return ducts connecting said pocket with the inner or bearing surface of the bushing.

2. A bearing bushing comprising a one-piece cylindrical body formed with an external depression constituting an oil-pocket, an internal bearing aperture, and a capillary oil-supply duct leading through the wall of said cylindrical body from said pocket to said bearing aperture, said cylindrical body having internal circumferentially extending oil-catching grooves within its ends and gravity oil-return ducts leading from said grooves to said oil-pocket.

3. A bearing bushing comprising a sleeve having an inner bearing surface, an outer surface formed with a depression constituting an oil-pocket, and a capillary duct cut through the wall of said sleeve and connecting the oil-pocket with the inner bearing surface, said sleeve also having gravity oil-return ducts within its ends leading to said oil-pocket.

In testimony whereof, I have signed my name to this specification.

MARTIN HEMLEB.